United States Patent [19]

Tsai

[11] Patent Number: 5,816,597
[45] Date of Patent: Oct. 6, 1998

[54] PEDAL-PROPELLED VEHICLE STRUCTURE FOR AMUSEMENT SCOOTERS

[76] Inventor: Sung-Mao Tsai, No. 20-1, 157 Lane, Sec. 8, Yein-Pin N. Rd., Taipei, Taiwan

[21] Appl. No.: 889,806

[22] Filed: Jul. 8, 1997

[30] Foreign Application Priority Data

Feb. 19, 1997 [TW] Taiwan ................. 86202644

[51] Int. Cl.$^6$ ..................................... B62M 1/20
[52] U.S. Cl. .................... 280/226.1; 280/1.182; 280/218; 188/24.16
[58] Field of Search ............... 280/226.1, 218, 280/221, 223, 230, 234, 264, 1.175, 1.182, 1.192, 1.195; 188/24.16, 2 D

[56] References Cited

U.S. PATENT DOCUMENTS

| | | | |
|---|---|---|---|
| 868,329 | 10/1907 | Corbitt | 280/226.1 |
| 1,619,438 | 3/1927 | Schoenke | 280/218 |
| 2,651,527 | 9/1953 | Thoren | 280/226.1 |
| 2,774,611 | 12/1956 | Stueber et al. | 280/226.1 |
| 4,102,439 | 7/1978 | Calderazzo | 188/24.16 |

FOREIGN PATENT DOCUMENTS

| | | | |
|---|---|---|---|
| 410664 | 3/1923 | Germany | 280/1.182 |
| 420311 | 11/1934 | United Kingdom | 280/1.182 |

*Primary Examiner*—Anne Marie Boehler
*Assistant Examiner*—Michael Cuff
*Attorney, Agent, or Firm*—Beveridge, DeGrandi, Weilacher & Young LLP

[57] ABSTRACT

A pedal-propelled vehicle structure for amusement scooters is provided. The pedal-propelled vehicle includes a first supporting frame having a hollowed main column in which an elastic member is mounted, and a second supporting frame including an upright slidable bar having one end inserted into the hollowed inside of the hollowed main column on the first supporting frame. A forward-spanning mechanism is connected via a multi-directional mechanism to the second supporting frame. A backward-spanning mechanism is mounted on the second supporting frame. Further, a front adjustment device and a rear adjustment device are mounted on the second supporting frame, the front adjustment device being contacted to the forward-spanning mechanism for adjusting the span of the same, and the rear adjustment device being contacted to the backward-spanning mechanism for adjusting the span of the same. A linkage mechanism is coupled to pedals for transmitting the foot power from the rider to the forward-spanning mechanism and the backward-spanning mechanism. A steering mechanism is mounted on the second supporting frame for the rider to control the moving direction. A brake mechanism is coupled to the front and rear wheels so as to brake the front and rear wheels. A brake control mechanism is mounted on the steering mechanism for controlling the brake mechanism to then control the brake and the forward and backward movements of the vehicle.

42 Claims, 12 Drawing Sheets

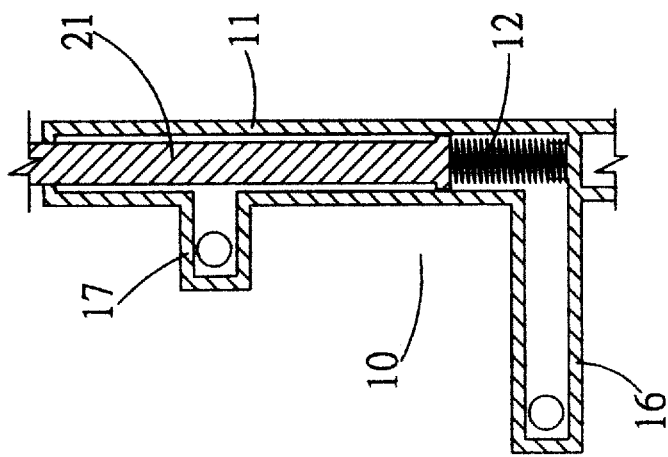
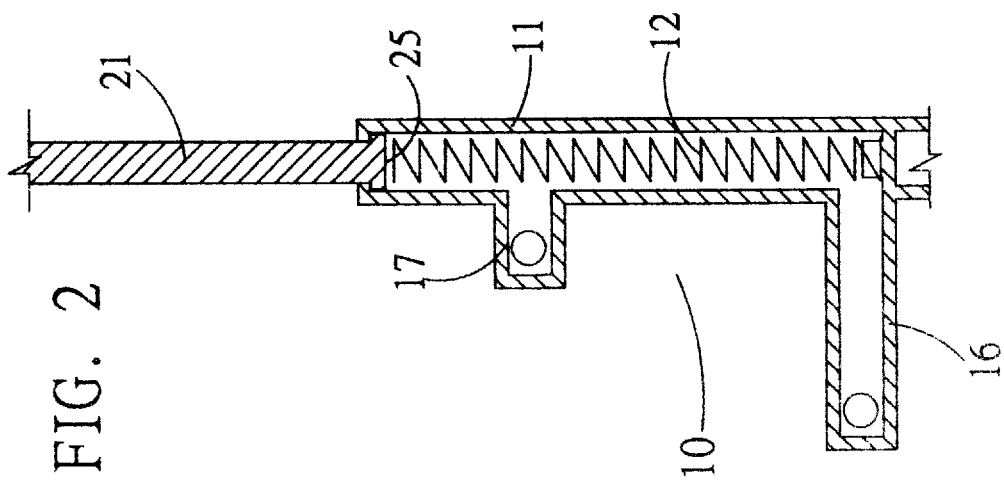

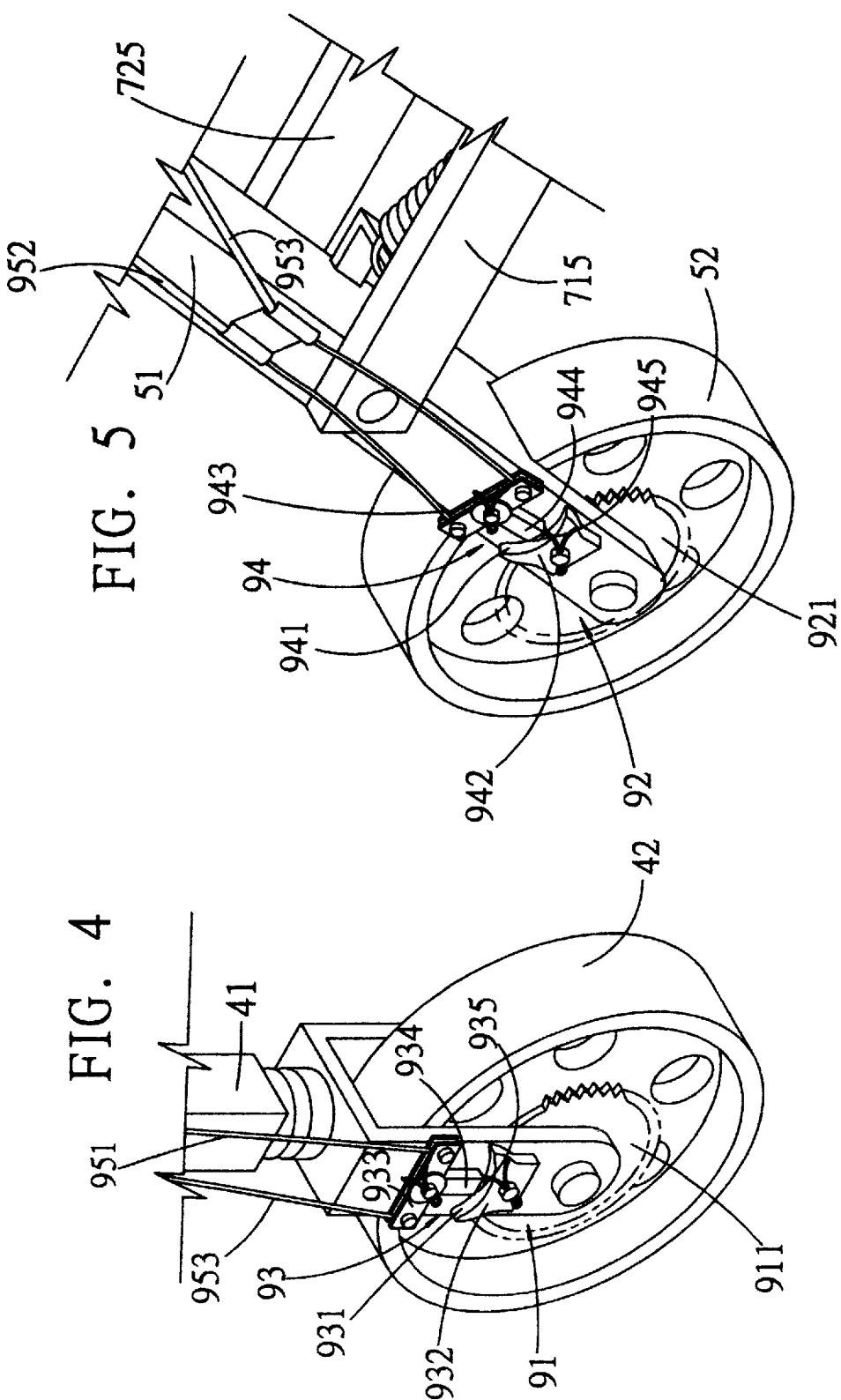

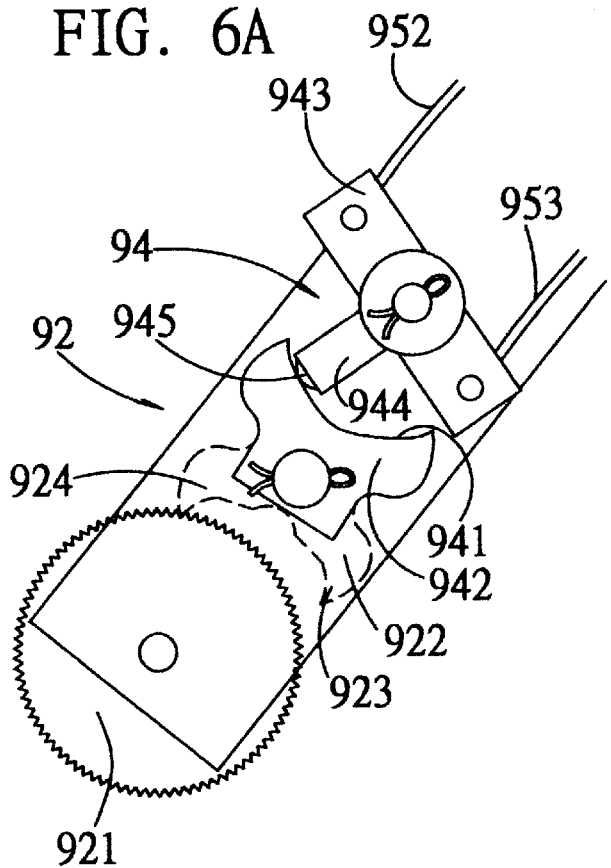
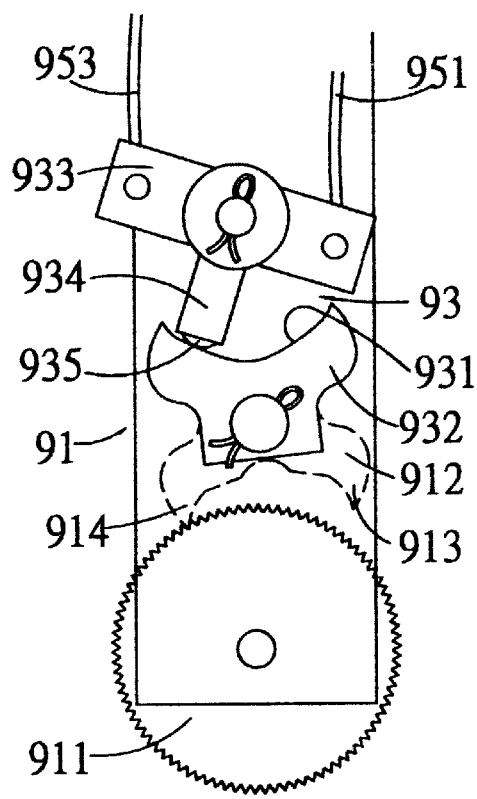
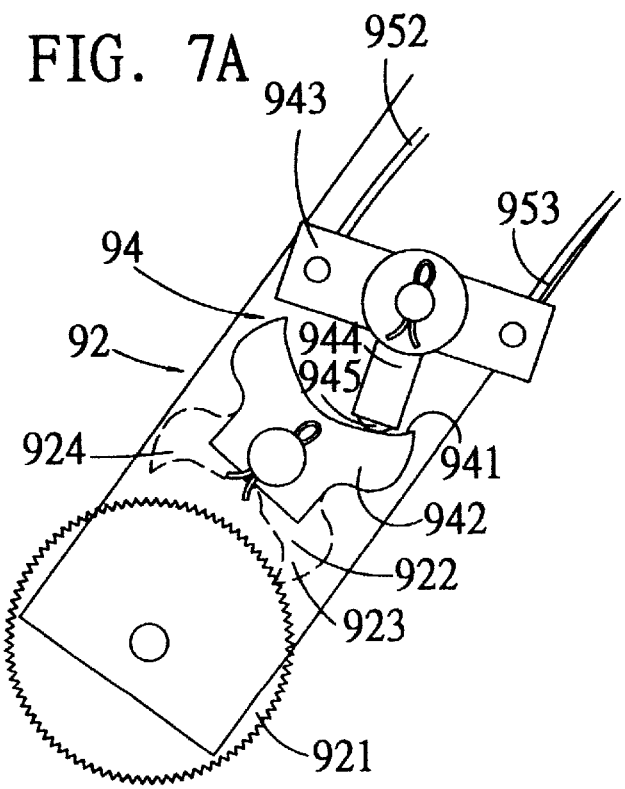
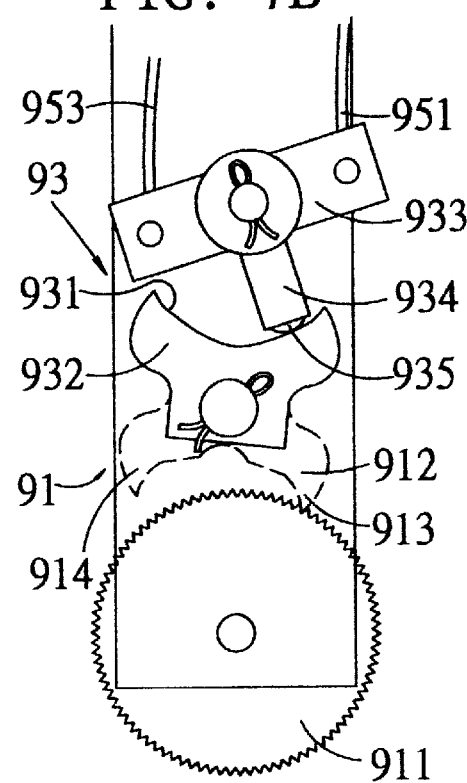

PEDAL-PROPELLED VEHICLE STRUCTURE FOR AMUSEMENT SCOOTERS

BACKGROUND OF THE INVENTION

1. Field of the Invention

This invention relates to vehicle structures, and more particularly, to a pedal-propelled vehicle structure which allows the children to ride thereon for amusement purpose. The pedal-propelled vehicle of the invention utilizes the weight of the rider to press down on a second supporting frame and a linkage mechanism and the elasticity of an elastic member in a first supporting frame to allow easy operation of the scooter. Also, the pedal-propelled vehicle utilizes a front adjustment device and a rear adjustment device provided ahead of a forward-spanning mechanism and on the back of a backward-spanning mechanism, respectively, to adjust the span of the same so as to overcome the drawback of needing larger force for operating the scooter. Furthermore, the pedal-propelled vehicle includes improved steering mechanism and brake mechanism that allow the rider to easily control the movements and brake of the scooter.

2. Description of Related Art

The scooter horse is a popular amusement contrivance for the children to ride thereon with pleasure. The children can ride a scooter horse around. Advanced designs also allow the children to experience up-and-down movements while riding the scooter horse. Various scooter structures have been disclosed. For instances, the ROC Patent Publication No. 99906 discloses a pedal-propelled vehicle structure which allows the children to ride the scooter by means of pedal means which is linked to the wheels via driving means. In this patent, the driving means includes a slantly engaged member and a spring for driving the gears coupled to the wheels. This scooter structure allows the scooter to move forward, but not backwards. Further, the ROC Patent Publication No. 103441 discloses a pedal-propelled vehicle horse which is steered by a handlebar and is propelled by pushing the feet against the ground. This scooter can be moved either in the forward direction or in the backward direction and can be steered to move in various directions to the side. One drawback to this patent, however, is that the structure is too complex to construct. The manufacture and maintenance are difficult to carry out. Moreover, when moving backwards, the operation of the control bar by the rider to drive the front and rear wheels is difficult. This difficult operation is particularly unappealing to the children. Furthermore, the ROC Patent Publication No. 122696 discloses a scooter horse which can move and can provide wobbling effect to the riding. This scooter horse is quite simple in structure. When this scooter horse wobbles, the center of weight of the rider will pass an incline line that allows the wheels of the scooter horse to touch the ground, thus allowing the scooter horse to move forwards. One drawback to this patent, however, is that the scooter horse can only move forward, but can not move backwards and turn in directions. Still further, the ROC Patent Publication No. 269206 discloses another scooter horse which can move forwards or backwards by means of the shift of the center of weight of the rider. This patent, however, displays two problems. First, the movement of the scooter horse requires skilled operation by the rider, which may not be quite suitable for young children to play with. Second, an unskilled operation could cause the scooter horse to only make the up-and-down movements but not the forward-and-backward movements.

There exists, therefore, a need for an improved structure for the scooter horse which represents a solution to the aforementioned drawbacks of the prior art.

SUMMARY OF THE INVENTION

It is therefore a primary objective of the present invention to provide a pedal-propelled vehicle structure which can provide up-and-down movements while riding the scooter by providing an elastic member in a hollowed main column on a first supporting frame that elastically supports an upright slidable bar on a second supporting frame.

It is another objective of the present invention to provide a pedal-propelled vehicle structure which utilizes a front adjustment device and a rear adjustment device provided ahead of a forward-spanning mechanism and on the back of a backward-spanning mechanism, respectively, to adjust the span of the same so as to overcome the drawback of needing larger force for operating the scooter.

It is still another objective of the present invention to provide a pedal-propelled vehicle structure which includes improved steering mechanism and bake mechanism that allow the rider to easily control the movements and brake of the scooter.

In accordance with the foregoing and other objectives of the present invention, an improved pedal-propelled vehicle structure for amusement scooters is provided. The pedal-propelled vehicle includes a first supporting frame, having a hollowed main column in which an elastic member is mounted, and a second supporting frame including an upright slidable bar having one end inserted into the hollowed inside of the hollowed main column on the first supporting frame to abut on the upper end of the elastic member. A forward-spanning mechanism is connected by means of a multi-directional mechanism to the second supporting frame, the forward-spanning mechanism including a front bar and a front wheel connected to the front bar; and a backward-spanning mechanism mounted on the second supporting frame, the backward-spanning mechanism including a rear bar and a rear wheel connected to the rear bar. A pair of pedals are sued to allow the rider of the pedal-propelled vehicle to supply foot power to the pedal-propelled vehicle. A linkage mechanism is coupled to the pedals for transmitting the foot power from the rider to the forward-spanning mechanism and the backward-spanning mechanism. A steering mechanism is mounted on the second supporting frame for the rider to control the moving direction of the pedal-propelled vehicle. A brake mechanism is coupled to the front and rear wheels so as to brake the front and rear wheels. A brake control mechanism is mounted on the steering mechanism for controlling the brake mechanism. The brake mechanism includes: a front brake mechanism coupled to the forward-spanning mechanism, including a front gear coupled to the front wheel, a front braking piece for applying brake to the front gear, and a front braking assembly for braking the front braking piece, the front braking assembly controlling the front braking piece so as to brake the front gear; a rear brake mechanism coupled to the backward-spanning mechanism, including a rear gear coupled to the rear wheel, a rear braking piece for applying brake to the rear gear, and a rear braking assembly for braking the rear braking piece, the rear braking assembly controlling the rear braking piece so as to brake the rear gear; and a transmission mechanism including a first transmission device connected to the brake control mechanism and the front braking assembly, a second transmission device connected to the brake control mechanism and the rear braking assembly, and a third transmission device connected to the front braking assembly and rear braking assembly, the transmission mechanism being under control of the brake control mechanism to control the front brake mechanism and the rear brake mechanism to brake the front and rear wheels.

BRIEF DESCRIPTION OF DRAWINGS

The invention can be more fully understood by reading the following detailed description of the preferred embodiments, with reference made to the accompanying drawings, wherein:

FIG. 2 is a schematic sectional diagram of a first supporting frame employed in the pedal-propelled vehicle structure of the invention;

FIG. 3 is a schematic sectional diagram of a second supporting frame employed in the pedal-propelled vehicle structure of the invention;

FIG. 4 is a perspective view of a front brake mechanism employed in the pedal-propelled vehicle structure of the invention;

FIG. 5 is a perspective view of a rear brake mechanism employed in the pedal-propelled vehicle structure of the invention;

FIGS. 6A and 6B are schematic diagrams used to depict the operation of the brake mechanism employed in the pedal-propelled vehicle structure of the invention;

FIGS. 7A and 7B are schematic diagrams used to depict the operation of the brake mechanism employed in the pedal-propelled vehicle structure of the invention;

DETAILED DESCRIPTION OF PREFERRED EMBODIMENT

Figure 1:
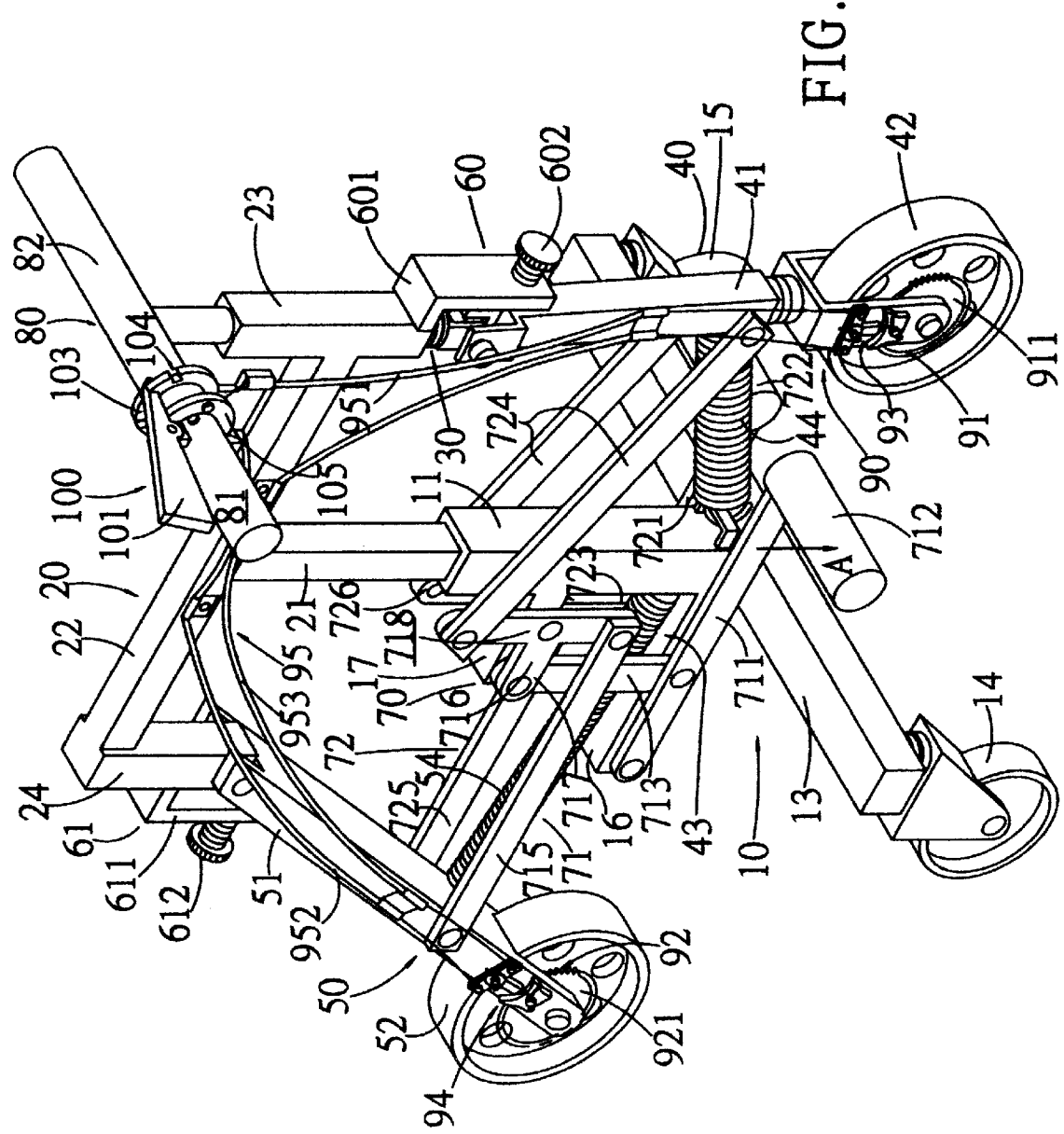
FIG. 1 is a perspective view of the pedal-propelled vehicle structure according to the present invention.

FIG. 1 is a perspective view of the pedal-propelled vehicle structure according to the present invention. This pedal-propelled vehicle structure includes a first supporting frame 10 having a hollowed main column 11. As shown in FIG. 2, an elastic member 12, such as a spiral spring, is mounted on the hollowed inside of the hollowed main column 11. Further, the pedal-propelled vehicle structure includes a second supporting frame 20 having an upright slidable bar 21 which has one end inserted into the hollowed inside of the hollowed main column 11 on the first supporting frame 10 to abut on the upper end of the elastic member 12. Further, the pedal-propelled vehicle structure includes a forward-spanning mechanism 40 which is coupled to the second supporting frame 20 via a multi-directional mechanism 30. The forward-spanning mechanism 40 includes a front bar 41 and a front wheel 42 coupled to the front bar 41. Further, the pedal-propelled vehicle structure includes a backward-spanning mechanism 50 having a rear bar 51 and a rear wheel 52 coupled to the rear bar 51. A front adjustment device 60 is mounted on the second supporting frame 20 and located ahead of the forward-spanning mechanism 40, and a rear adjustment device 61 is mounted on the second supporting frame 20 and located on the back of the backward-spanning mechanism 50. The front and rear adjustment devices 60, 61 are used to adjust the span between the front wheel 42 and rear wheel 52. The pedal-propelled vehicle structure further includes a linkage mechanism 70 which is connected to a pair of pedals 712, 722 for the rider to supply foot power that can drive the forward-spanning mechanism 40 and the backward-spanning mechanism 50. Furhter, the pedal-propelled vehicle structure includes a steering mechanism 80 is mounted on the second supporting frame 20 for the rider to direct the course of the pedal-propelled vehicle structure. A brake mechanism 90 is used to brake the front wheel 42 on the forward-spanning mechanism 40 and the rear wheel 52 on the backward-spanning mechanism 50. Furhter, a brake control mechanism 100 is mounted on the steering mechanism 80 for controlling the brake mechanism 90 to apply braking force to the front wheel 42 and rear wheel 52 to brake the pedal-propelled vehicle structure.

Referring to FIGS. 2 and 3 together with FIG. 1, there are shown schematic diagrams used to depict the coupling of the upright slidable bar 21 on the second supporting frame 20 to the hollowed main column 11 on the first supporting frame 10. As shown in FIG. 1, the first supporting frame 10 further includes a horizontally oriented first auxiliary beam 13 on the bottom of the hollowed main column 11. Furhter, a pair of auxiliary supporting wheels 14, 15 are mounted on both ends of the first auxiliary beam 13. A first supporting beam 16 and a second supporting beam 17 are connected horizontally to one side of the hollowed main column 11. The first supporting beam 16, the first auxiliary beam 13, and the hollowed main column 11 form a three dimensional structure. The first and second supporting beams 16, 17 are used in combination to support the linkage mechanism 70. The second supporting frame 20 further includes a horizontal main beam 22 supported on the upright slidable bar 21. A first connecting piece 23 and a second connecting piece 24 are connected to both ends of the horizontal main beam 22. The first connecting piece 23 is further connected via the multi-directional mechanism 30 to the forward-spanning mechanism 40, and the second connecting piece 24 is connected directly to the backward-spanning mechanism 50. The steering mechanism 80 is mounted on the first connecting piece 23. As shown in FIG. 2, the upright slidable bar 21 is formed with a flange 25 on the bottom which abuts on the upper end of the elastic member 12. Together, the top end of the hollowed main column 11 is formed with a narrowed opening that prevents the upright slidable bar 21 from being pulling away from the hollowed main column 11.

As shown in FIG. 1, the forward-spanning and backward-spanning mechanisms 40, 50 are linked by means of an elastic mechanism 43 to the hollowed main column 11 on the first supporting frame 10. The elastic mechanism 43 can pull the forward-spanning and backward-spanning mechanisms 40 50 inwards. The elastic mechanism 43 includes a first spiral spring 44 and a second spiral spring 54. The first spiral spring 44 is connected between the front bar 41 on the forward-spanning mechanism 40 and the hollowed main column 11 on the first supporting frame 10, and the second spiral spring 54 is connected between the rear bar 51 on the backward-spanning mechanism 50 and the hollowed main column 11 on the first supporting frame 10. The first spiral spring 44 can pull the forward-spanning mechanism 40 inwards when the front wheel 42 is to be moved inwards, and the second spiral spring 54 can pull the backward-spanning mechanism 50 inwards when the rear wheel 52 is to be moved inwards.

The front and rear adjustment devices 60, 61 are each formed with a mounting piece, respectively designated by the reference numerals 601, 611, for securing them respectively on the first and second connecting pieces 23, 24 on the second supporting frame 20. Furhter, the mounting pieces 601, 611 are each provided with a screwing number, respectively designated by the reference numerals 602, 612, which can be screwed in and out to abut against the forward-spanning and backward-spanning mechanism 40, 50, respectively, so as to restrict the outwardly expanding angles of the forward-spanning and backward-spanning mechanisms 40, 50.

The linkage mechanism 70 includes a first linkage assembly 71 and a second linkage assembly 72 on both sides of the first supporting frame 10 and connected between the forward-spanning and backward-spanning mechanisms 40, 50. The first linkage assembly 71 and the second linkage assembly 72 are substantially identical in structure, but the first linkage assembly 71 is mounted on the right side of the pedal-propelled vehicle structure while the second linkage assembly 72 is mounted on the left side of the same.

The first linkage assembly 71 includes a first linkage bar 711 having one end connected to the first supporting beam 16 on the first supporting frame 10 and the other end connected to a right-foot pedal 712; a second linkage bar 713 having one end connected to the first linkage bar 711; a third linkage bar 714 having one end connected to the front bar 41 on the forward-spanning mechanism 40; a fourth linkage bar 715 having one end connected to the rear bar 51 on the backward-spanning mechanism 50; and a substantially T-shaped linkage piece 716 having a first connecting piece 717 and a second connecting piece 718 which are perpendicularly jointed at a jointing point which is pivotally connected to the second supporting beam 17 on the first supporting frame 10.

Similarly, the second linkage assembly 72 includes a first linkage bar (not shown) connected to a left-foot pedal 722; a second linkage bar (not shown); a third linkage bar 724 having one end connected to the front bar 41 on the forward-spanning mechanism 40; a fourth linkage bar 725 having one end connected to the rear bar 51 on the backward-spanning mechanism 50; a substantially T-shaped linkage piece 726 having a first connecting piece (not shown) and a second connecting piece (not shown) which are perpendicularly jointed at a jointing point which is pivotally connected to the second supporting beam 17 on the first supporting frame 10. Some of the components are not shown because in FIG. 1 they are on the left side of the pedal-propelled vehicle structure and thus not visible.

The first connecting piece 717 has a first end pivotally connected to one end of the second linkage bar 713 and a second end connected to the second connecting piece 718; and the second connecting piece 718 has a first end pivotally connected to the third linkage bar 714 and a second end pivotally connected to the fourth linkage bar 715. By means of the foregoing linkage mechanism 70, whenever the rider's feet push downwards as indicated by the arrow A in FIG. 1 against the right-foot pedal 712 and the left-foot pedal 722, the foot power will be transmitted through the linkage mechanism 70 to extend the forward-spanning mechanism 40 and backward-spanning mechanism 50 outwards.

FIGS. 4, 5, 6A, 6B, 7A, 7B, 8A, 8B show the brake mechanism employed in the pedal-propelled vehicle structure of the invention for stopping the movement. As shown in FIGS. 4 and 5, the brake mechanism 90 includes a front brake mechanism 91 mounted on the front bar 41 on the forward-spanning mechanism 40 and a rear brake mechanism 92 mounted on the rear bar 51 on the backward-spanning mechanism 50. The front brake mechanism 91 includes a front gear 911 axially coupled to the front wheel 42, a front braking piece 912 for braking the front gear 911, and a front braking assembly 93 for braking the front braking piece 912. The front braking assembly 93 is used to control the front braking piece 912 to brake the front gear 911. Similarly, the rear brake mechanism 92 includes a rear gear 921 axially coupled to the rear wheel 52, a rear braking piece 922 for braking the rear gear 921, and a rear braking assembly 94 for braking the rear braking piece 922. The rear braking assembly 94 is used to control the rear braking piece 922 to brake the rear gear 921. The brake mechanism 90 further includes a transmission mechanism 95 for power transmission. The transmission mechanism 95 includes a first transmission device 951 connected between the brake control mechanism 100 and the front braking assembly 93, a second transmission device 952 connected between the brake control mechanism 100 and the rear braking assembly 94, and a third transmission device 953 connected between the front braking assembly 93 and the rear braking assembly 94. Via the transmission mechanism 95, the brake control mechanism 100 can control the front brake mechanism 91 or the rear brake mechanism 92 to apply a braking force to the front wheel 42 or rear wheel 52 so as to inhibit the forward or backward motion of the vehicle. The front braking assembly 93 includes a braking piece 932 having a curved back 931; a front pivoting bar 933 pivotally connected to the front bar 41 and having one end connected to the first transmission device 951 and the other end connected to the third transmission device 953; a braking bar 934 mounted at the pivoting point of the front pivoting bar 933 and having an elastic member (not shown) therein; and a ball bearing 935 mounted at the tip of the braking bar 934 for allowing the braking bar 934 to slide freely over the curved back 931 of the braking piece 932. The braking bar 934 can push against the braking piece 932 so as to drive the front braking piece 912 to apply a braking force. The front braking piece 912 includes a pair of horn-like pieces 913, 914 which are used to brake the front gear 911. Similarly, the rear braking assembly 94 includes a braking piece 942 having a curved back 941; a rear pivoting bar 943 pivotally connected to the rear bar 51 and having one end connected to the second transmission device 952 and the other end connected to the third transmission device 953; a braking bar 944 mounted at the pivoting point of the rear pivoting bar 943 and having an elastic member (not shown) therein; and a ball bearing 945 mounted at the tip of the braking bar 944 for allowing the braking bar 944 to slide freely over the curved back 941 of the braking piece 942. The braking bar 944 can push against the braking piece 942 so as to drive the rear braking piece 922 to apply a braking force. The rear braking piece 922 includes a pair of horn-like pieces 923, 924 which are used to brake the rear gear 921.

Referring to FIGS. 6A and 6B, when the second transmission device 952 is pulled by the brake control mechanism 100, the rear pivoting bar 943 will be rotated, thereby driving the third transmission device 953. This also causes the front pivoting bar 933 to be rotated by the third transmission device 953, thereby loosing the first transmission device 951. As a result, the front pivoting bar 933 drives the braking bar 934 to move along the curved back 931 of the braking piece 932 to the left of the braking piece 932; and meanwhile the rear pivoting bar 943 drives the braking bar 944 to move along the curved back 941 of the braking piece 942 to the left of the braking piece 942; whereby the horn-like piece 924 of the rear braking piece 922 is pushed forward to brake the rear gear 921 while the horn-like piece 913 of the front braking piece 912 is set away from the front gear 911. As a result of this, the rear wheel 52 is braked while the front wheel 42 is still free to rotate. This allows the vehicle to move forward.

On the other hand, as shown in FIGS. 7A. 7B, when the first transmission device 951 is pulled by the brake control mechanism 100, the front pivoting bar 933 will be rotated, thereby driving the third transmission device 953. This also causes the rear pivoting bar 943 to be rotated by the third transmission device 953, thereby loosing the second transmission device 952. As a result, the front pivoting bar 933 drives the braking bar 934 to move along the curved back 931 of the braking piece 932 to the right of the braking piece 932; and meanwhile the rear pivoting bar 943 drives the braking bar 944 to move along the curved back 941 of the braking piece 942 to the right of the braking piece 942; whereby the horn-like piece 913 of the front braking piece 912 is pushed forward to brake the front gear 911 while the horn-like piece 923 of the rear braking piece 922 is set away from the rear gear 921. As a result of this, the front wheel 42 is braked while the rear wheel 52 is still free to rotate. This allows the vehicle to move backward.

Figure 8A:
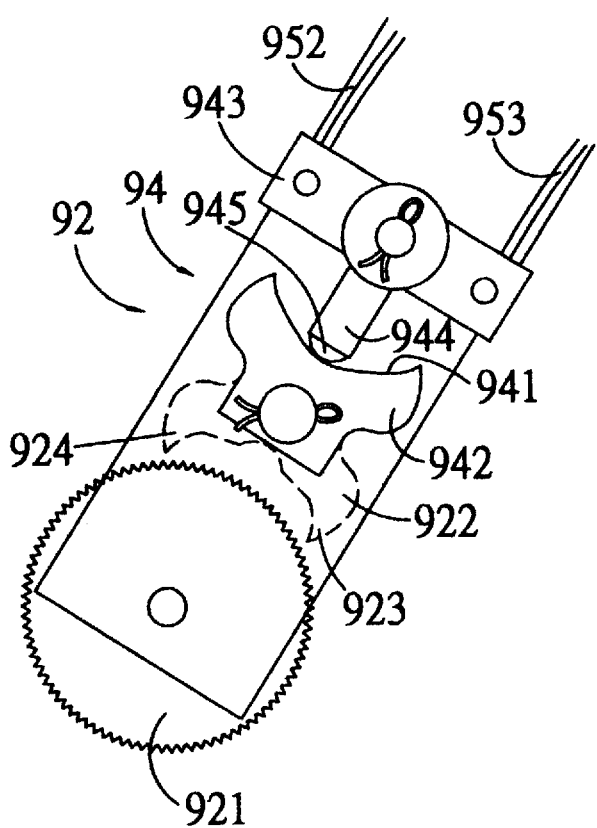
FIGS. 8A and 8B are schematic diagrams used to depict the operation of the brake mechanism employed in the pedal-propelled vehicle structure of the invention.
Figure 8B:
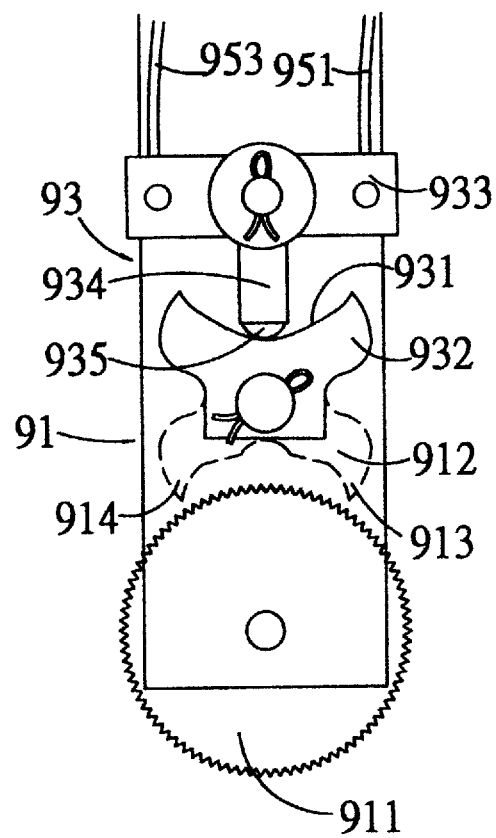
Figure 9:
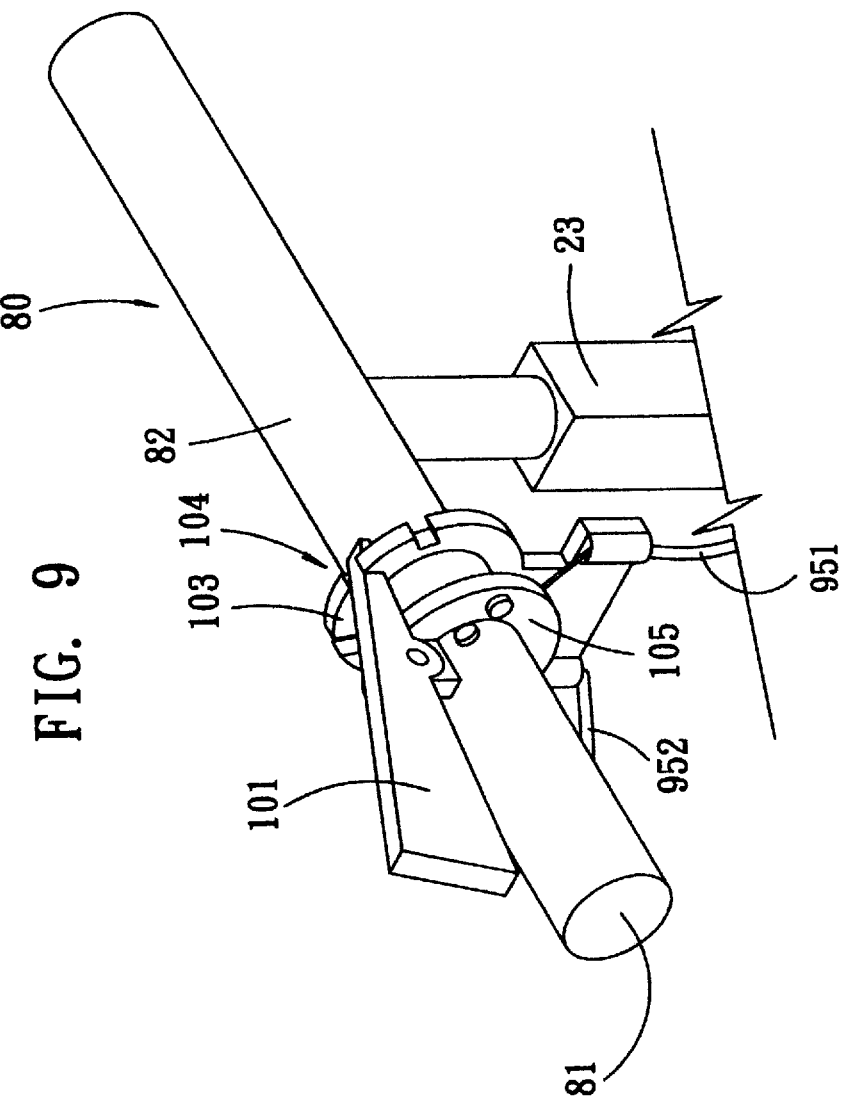
FIG. 9 is a perspective view of a brake control mechanism employed in the pedal-propelled vehicle structure of the invention.
Figure 10:
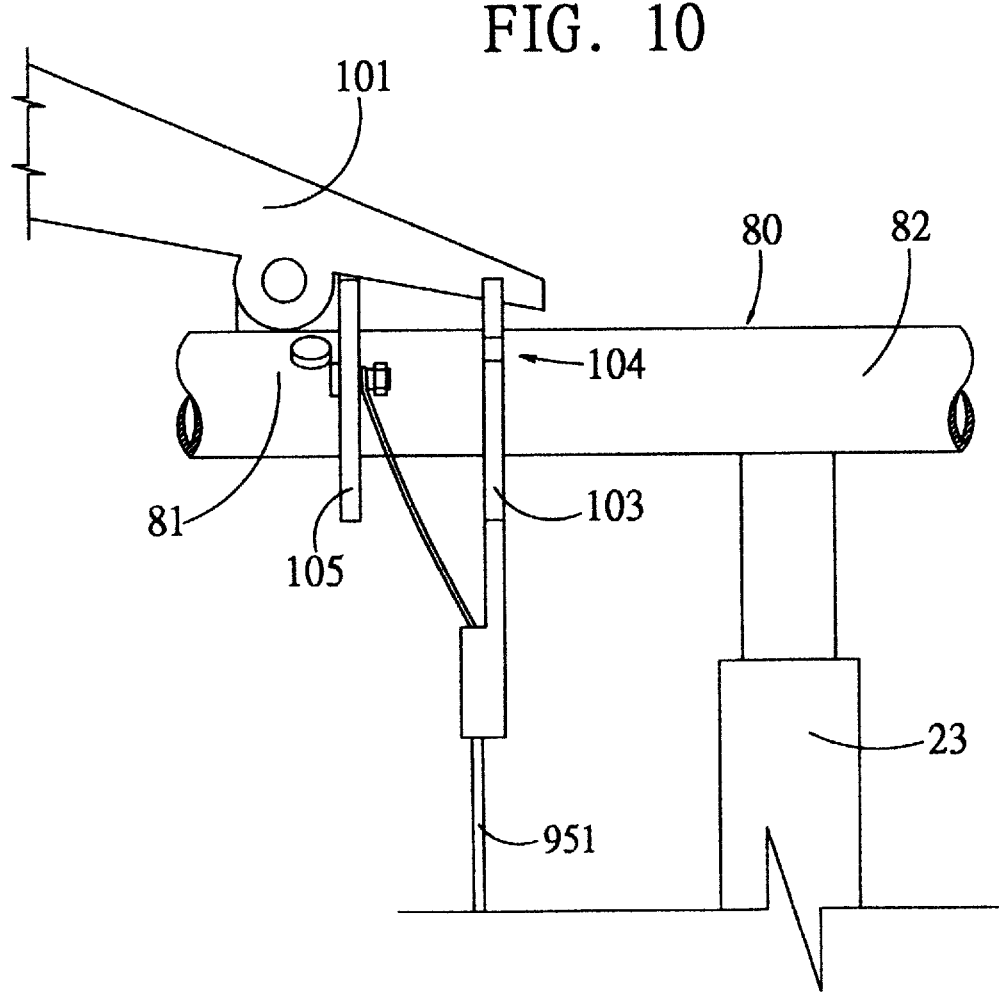
FIG. 10 is a side view of the brake control mechanism of FIG. 9.
Figure 11:
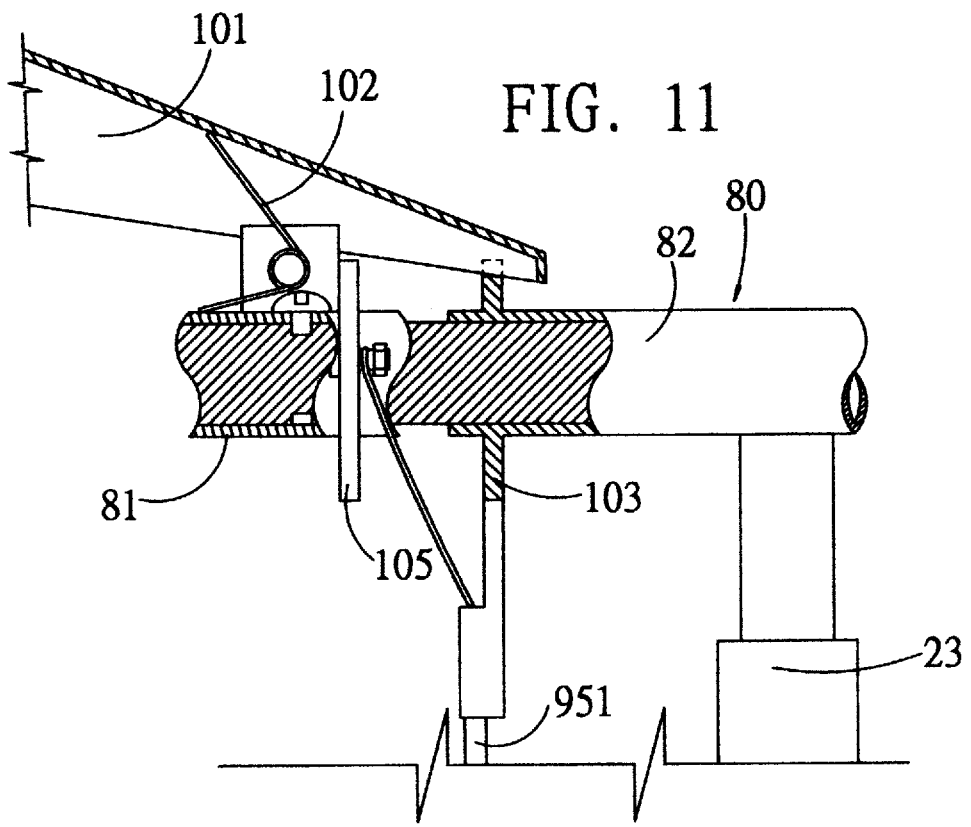
FIGS. 11 and 12 are schematic diagrams of the brake control mechanism of FIG. 9 used to depict the operation of the same.
Figure 12:
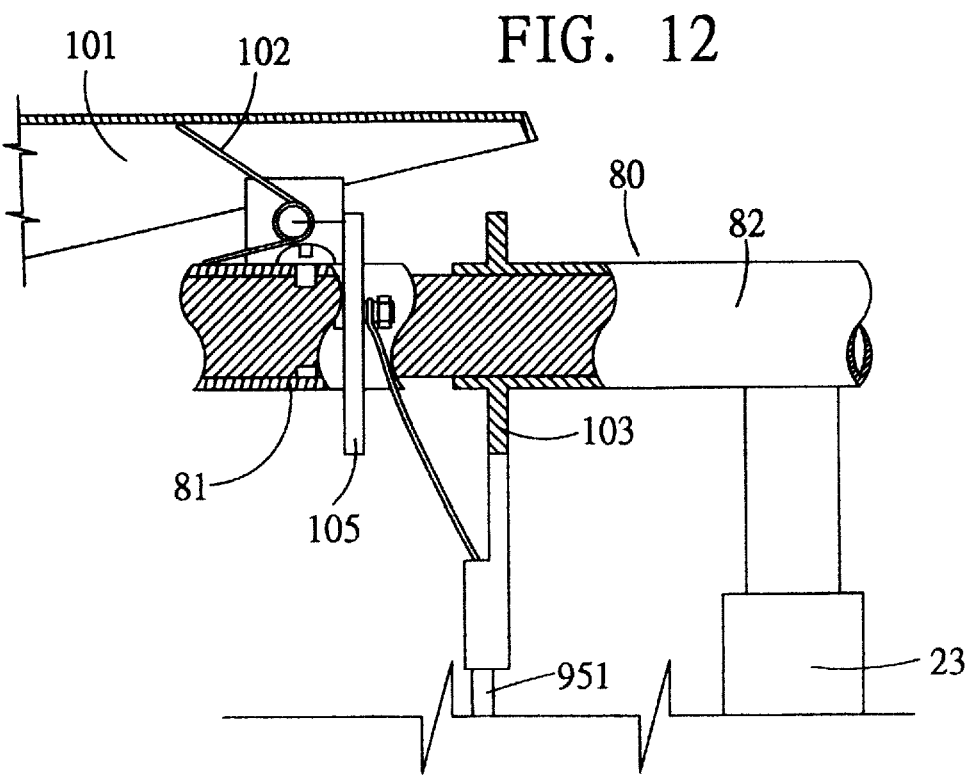

Furthermore, as shown in FIGS. 8A and 8B, when the first and second transmission devices 951, 952 are not pulled by the brake control mechanism 100, the braking bar 944 will not rotate and rive the third transmission device 953. In this case, the front pivoting bar 933 and rear pivoting bar 943 are respectively positioned respectively at the middle of the curved back 931 of the braking piece 932 and the curved back 941 of the braking piece 942. As a result, the horn-like pieces 913, 914 of the front braking piece 912 and the horn-like pieces 923, 924 of the rear braking piece 922 are all set away from the front gear 911 and rear gear 921, so that the front wheel 42 and rear wheel 52 are not braked. This allows the vehicle to be inhibited from moving forward or backward while allowing the seat of the vehicle to make up-and-down movements.

FIGS. 9, 10, 11, 12 illustrate the structure and operation of the brake control mechanism 100 used in the pedal-propelled vehicle structure of the invention. As shown, the brake control mechanism 100 includes a brake lever 101 pivotally connected to a turnable handlebar 81 on the steering mechanism 80. An elastic member 102 is mounted between the brake lever 101 and the turnable handlebar 81, having two elongated ends elastically abutting respectively on the brake lever 101 and the turnable handlebar 81, which allows the brake lever 101 to be restored to original position after being pressed and released. A mounting device 103 is fixed on the handlebar 82 on the steering mechanism 80. The mounting device 103 is formed with a plurality of positioning holes 104 for positioning of the brake lever 101. Furhter, the brake control mechanism 100 includes a control device 105 mounted on the turnable handlebar 81 for controlling the brake mechanism 90.

Figure 13A:
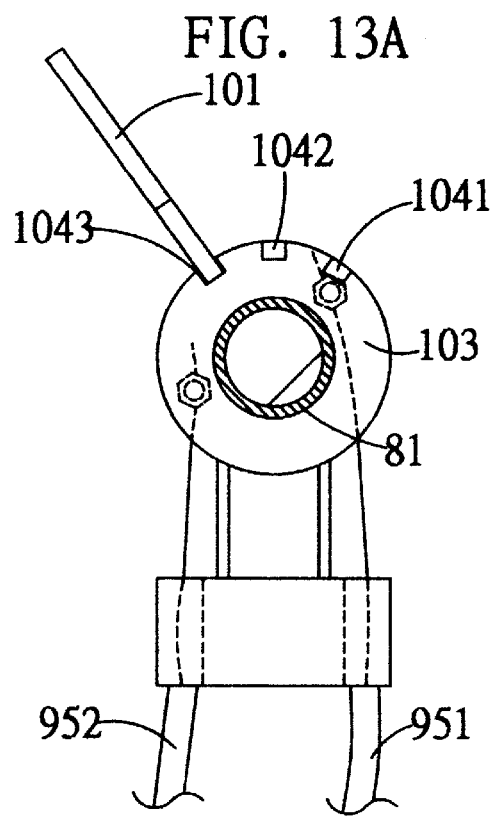
FIGS. 13A through 13C are schematic sectional diagrams of the brake control mechanism of FIG. 9 used to depict the operation of the same.
Figure 13C:
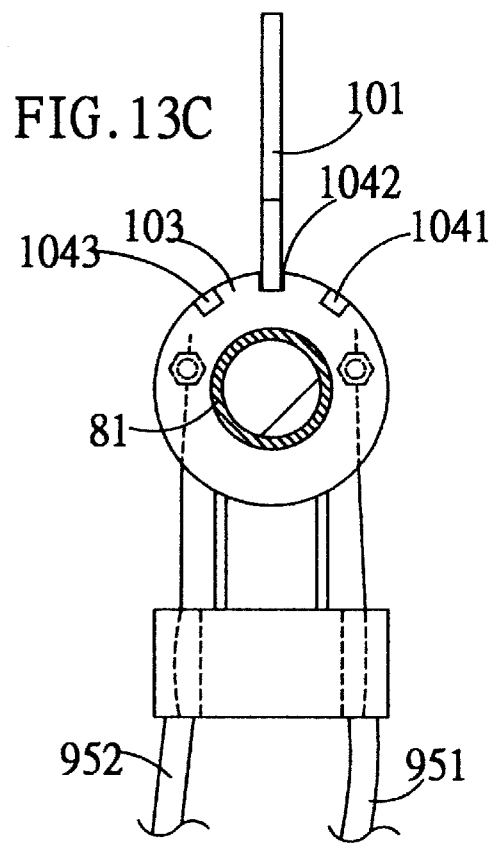
Figure 13B:
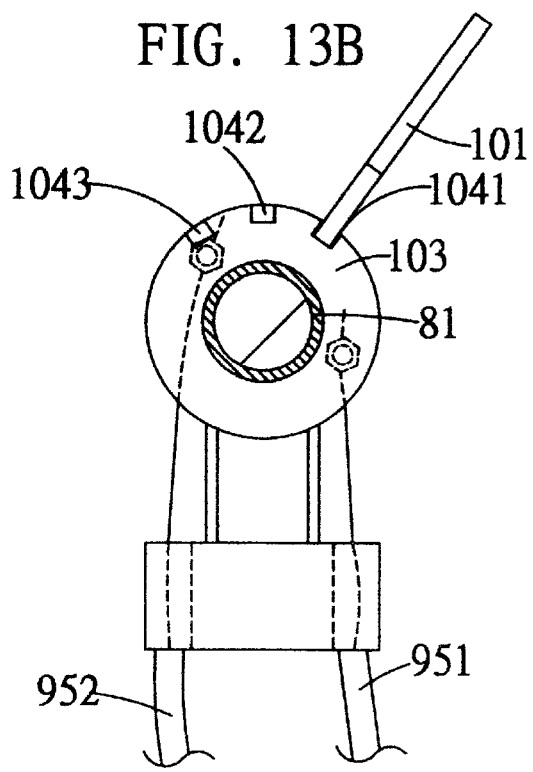

FIGS. 13A, 13B, and 13C are schematic diagrams used to depict the operation of the brake control mechanism 100. As shown in FIG. 13A, when the brake lever 101 is pressed down to the lower positioning holes 1043, the first transmission device 951 is pulled. This causes the horn-like piece 913 of the front braking piece 912 to brake the front gear 911, while setting the horn-like piece 923 of the rear braking piece 922 away from the rear gear 921. As a result, the front wheel 42 is braked while the rear wheel 52 is free to move. In this case, the vehicle can move backward.

Furhter, as shown in FIG. 13B, when the brake lever 101 is pressed to move to the upper positioning holes 1041, the second transmission device 952 is pulled. This causes the horn-like piece 924 of the rear braking piece 922 to brake the rear gear 921 while setting the horn-like piece 913 away from the front gear 911. As a result, the rear wheel 52 is braked while the front wheel 42 is free to move. In this case, the vehicle can move forward.

As shown in FIG. 13C, when the brake lever 101 is pressed to move to the middle positioning holes 1042, the first and second transmission devices 951, 952 are both not pulled. This causes all of the horn-like pieces 913, 914 of the front braking piece 912 and the horn-like pieces 923, 924 of the rear braking piece 922 to be set away from the front gear 911 and rear gear 921. The front wheel 42 and rear wheel 52 are thus not braked by the front braking piece 912 and rear braking piece 922 respectively. In this case, the vehicle can be inhibited from moving forward or backward to make up-and-down movements standing still at a fixed place.

Figure 14:
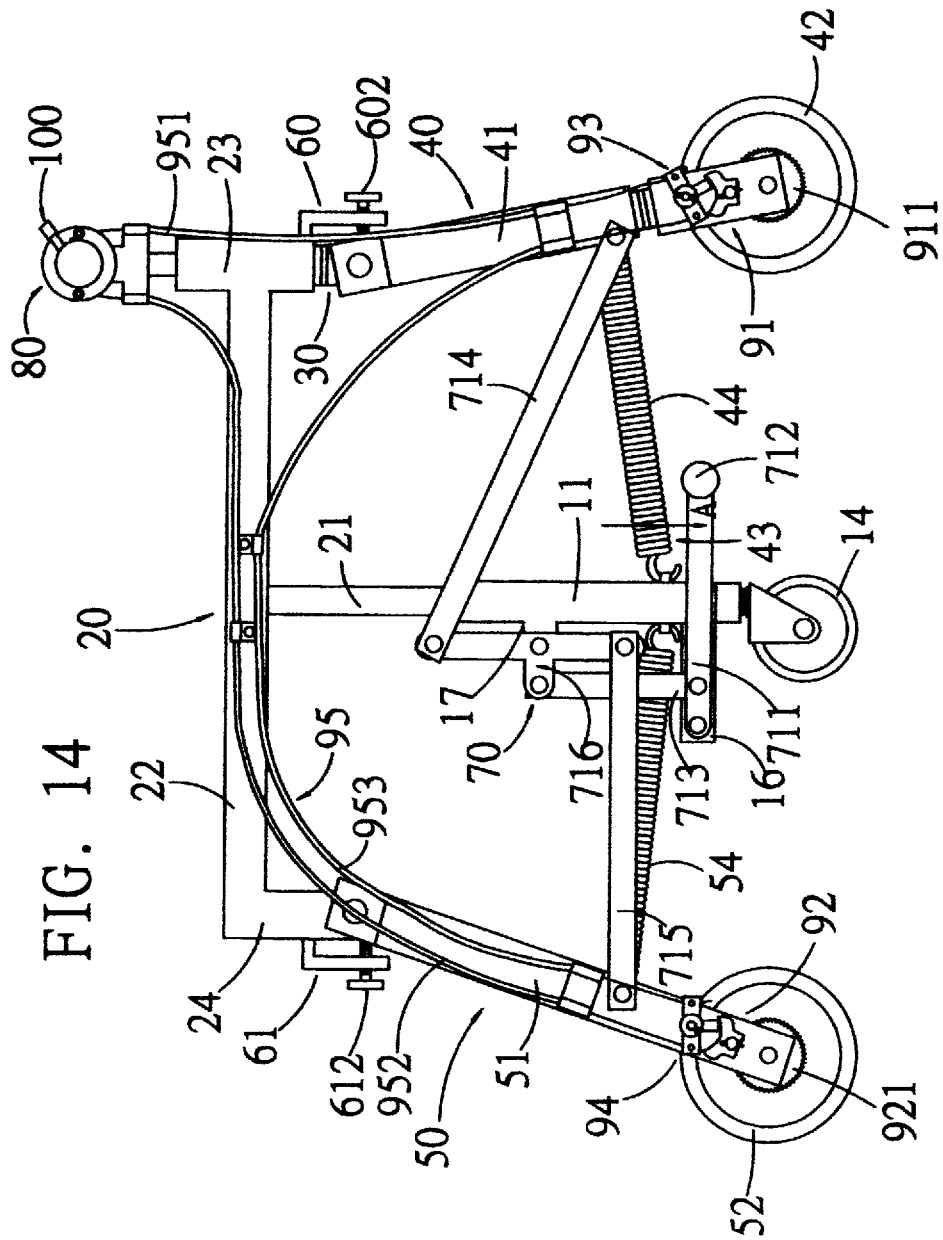
FIGS. 14 and 15 are side views of the pedal-propelled vehicle structure of FIG. 1 used to depict the operation of the same.
Figure 15:
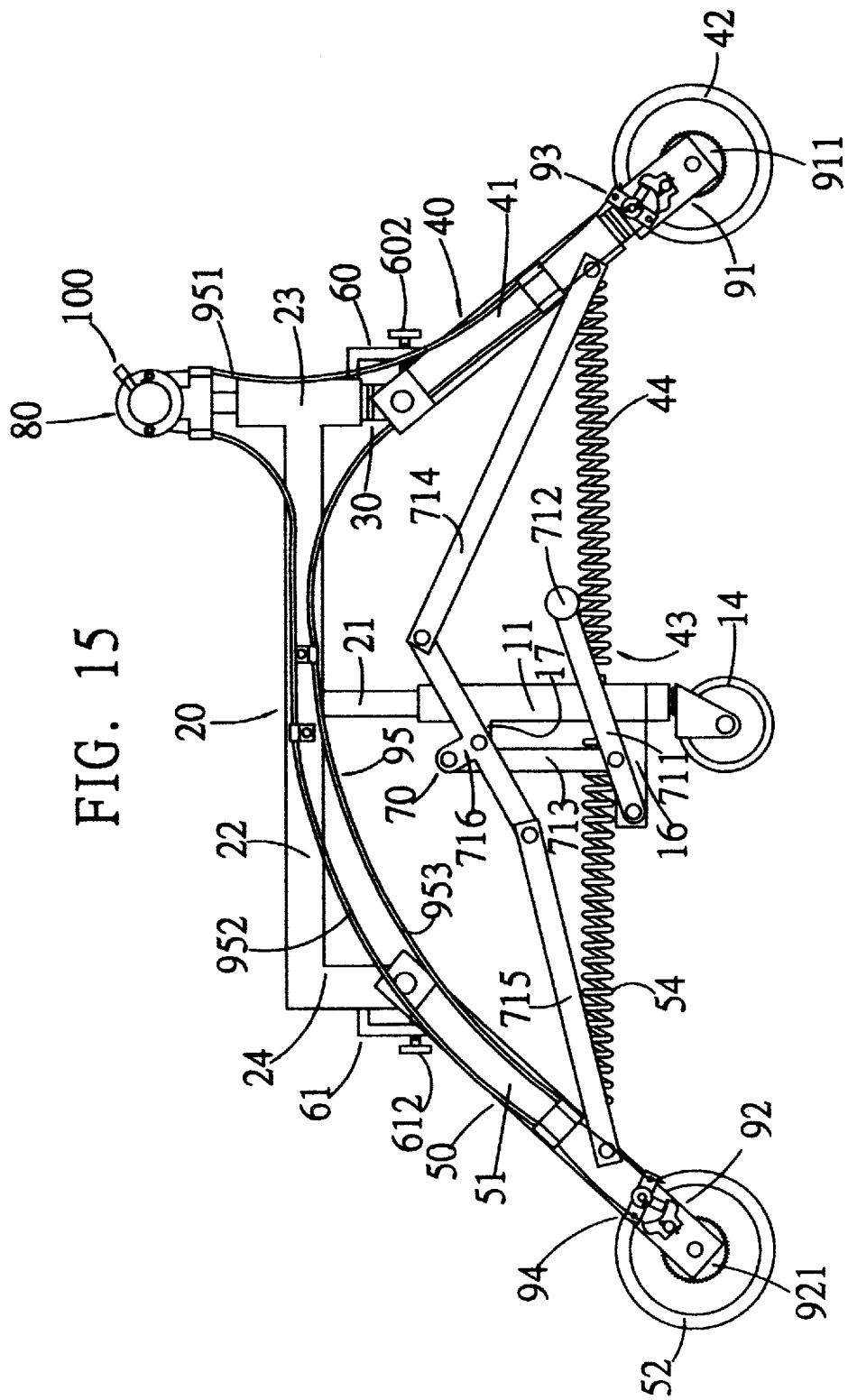
Figure 16:
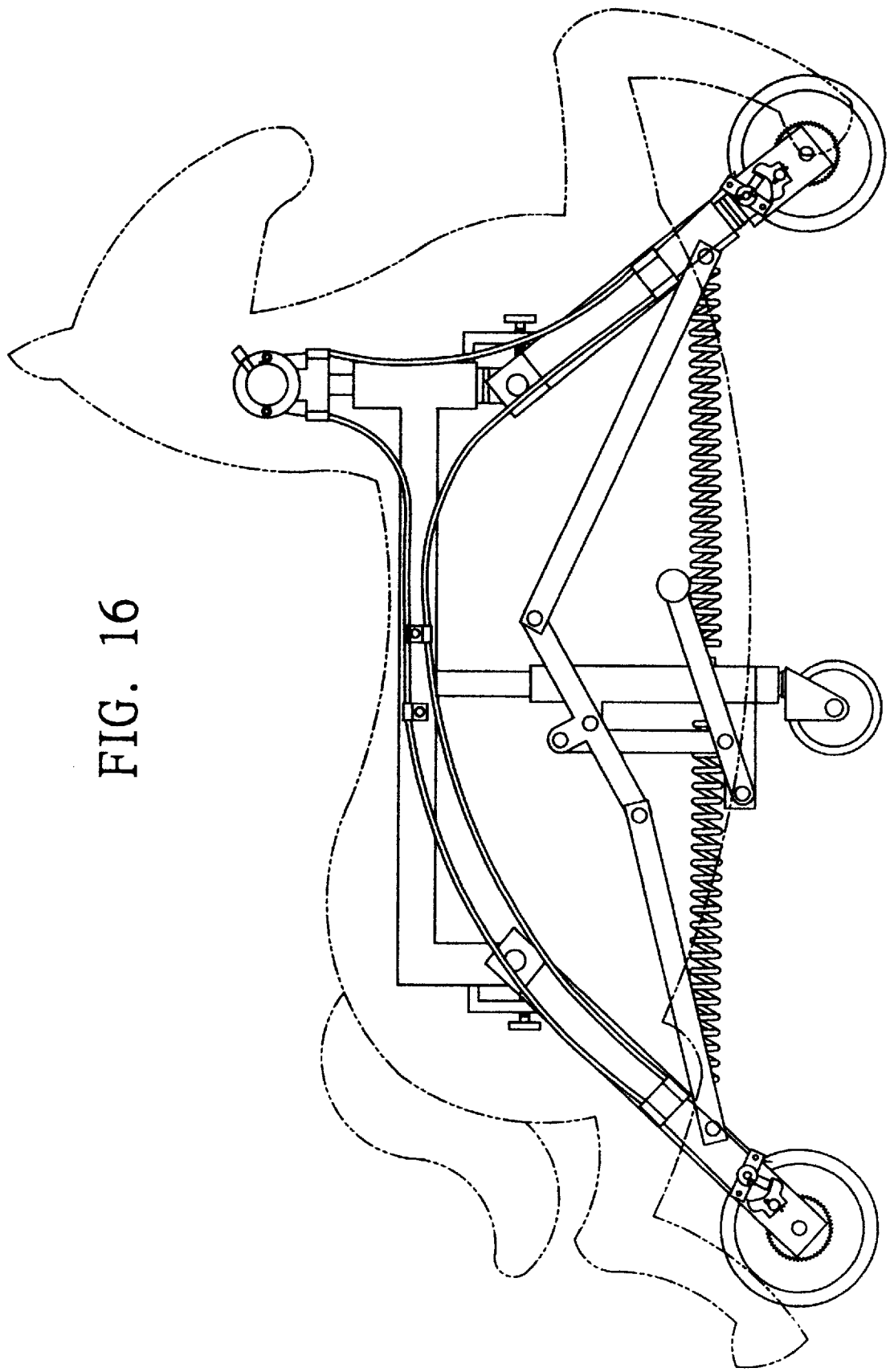
FIG. 16 is a schematic diagram used to show the utilization of the pedal-propelled vehicle structure of the invention as a scooter horse.

FIGS. 14, 15, and 16 illustrate and depict the utilization of the pedal-propelled vehicle structure of the invention. As shown in FIG. 14, when the rider treads forcibly on the right-foot pedal 712 and left-foot pedal 722, the rider will be pushed upwards while the forward-spanning mechanism 40 and backward-spanning mechanism 50 are drawn inwards. As further shown in FIG. 15, the rider then descends. In this time, the rider does not have to tread on the pedals 712, 722. The rider can then use the steering mechanism 80 to control the brake control mechanism 100 in various manner as described earlier so as to move in various directions.

Referring to FIG. 16, in practice, the pedal-propelled vehicle structure of the invention can be mounted with a seating body designed in the shape of an animal, for example, a horse, so that a child can sit on the seating body to ride the scooter comfortably and also for amusement purpose. Alternatively, the seating body can be shaped in the form of an elephant, moose, camel, and so on. Moreover, the front and rear wheels can be a cylinder body that allows the vehicle to move on beaches.

In conclusion, the invention provides a pedal-propelled vehicle structure on which a wooden animal or the like can be mounted for a rider to ride thereon in various directions. Furhter, the rider can feel the up-and-down movements of the wooden animal like riding a real animal.

The invention has been described using exemplary preferred embodiments. However, it is to be understood that the scope of the invention is not limited to the disclosed embodiments. To the contrary, it is intended to cover various modifications and similar arrangements. The scope of the claims, therefore, should be accorded the broadest interpretation so as to encompass all such modifications and similar arrangements.

What is claimed is:

1. A pedal-propelled vehicle structure, comprising:

a first supporting frame, having a hollowed main column in which an elastic member is mounted;

a second supporting frame including an upright slidable bar having one end inserted into the hollowed inside of said hollowed main column on said first supporting frame to abut on the upper end of said elastic member;

a forward-spanning mechanism connected by means of a multi-directional mechanism to said second supporting frame, said forward-spanning mechanism including a front bar and a front wheel connected to said front bar;

a backward-spanning mechanism mounted on said second supporting frame, said backward-spanning mechanism including a rear bar and a rear wheel connected to said rear bar;

pedal means for a rider of said pedal-propelled vehicle to supply foot power to said pedal-propelled vehicle;

a linkage mechanism, coupled to said pedal means, for transmitting the foot power from the rider to said forward-spanning mechanism and said backward-spanning mechanism;

a steering mechanism, mounted on said second supporting frame, for the rider to control the moving direction of said pedal-propelled vehicle;

a brake mechanism, coupled to said front and rear wheels so as to brake said front and rear wheels, said brake mechanism including:

a front brake mechanism coupled to said forward-spanning mechanism,. including a front gear coupled to said front wheel, a front braking piece for applying brake to said front gear, and a front braking assembly for braking said front braking piece, said front braking assembly controlling said front braking piece so as to brake said front gear;

a rear brake mechanism coupled to said backward-spanning mechanism, including a rear gear coupled to said rear wheel, a rear braking piece for applying brake to said rear gear, and a rear braking assembly for braking said rear braking piece, said rear braking assembly controlling said rear braking piece so as to brake said rear gear; and a transmission mechanism including a first transmission device connected to a brake control mechanism and said front braking assembly, said brake control mechanism being mounted on said steering mechanism for controlling said brake mechanism; a second transmission device connected to said brake control mechanism and said rear braking assembly; and a third transmission device connected to said front braking assembly and rear braking assembly, said transmission mechanism being under control of said brake control mechanism to control said front brake mechanism and said rear brake mechanism to brake said front and rear wheels.

2. The pedal-propelled vehicle structure of claim 1, wherein said first supporting frame includes:

a first auxiliary beam horizontally oriented mounted on the bottom of said hollowed main column; a pair of auxiliary supporting wheels mounted on both ends of said first auxiliary beam; and a first supporting beam and a second supporting beam connected horizontally to one side of said hollowed main column for supporting said linkage mechanism; said first supporting beam, said first auxiliary beam, and said hollowed main column forming a three dimensional structure.

3. The pedal-propelled vehicle structure of claim 1, wherein said forward-spanning and backward-spanning mechanisms are linked by means of an elastic mechanism connected to said hollowed main column on said first supporting frame, said elastic mechanism being used to pull said forward-spanning and backward-spanning mechanisms inwards.

4. The pedal-propelled vehicle structure of claim 3, wherein said elastic mechanism includes:

a first spring connected between said front bar on said forward-spanning mechanism and said hollowed main column on said first supporting frame; and a second spring connected between said rear bar on said backward-spanning mechanism and said hollowed main column on said first supporting frame.

5. The pedal-propelled vehicle structure of claim 1, wherein said upright slidable bar has a flange abutting on said elastic member and said hollowed main column has a narrowed opening for preventing said upright slidable bar from being pulled away from said hollowed main column.

6. The pedal-propelled vehicle structure of claim 1, wherein said second supporting frame further includes a main beam supported on said upright slidable bar and a first connecting piece and a second connecting piece mounted on both ends of said main bean, said first connecting piece being connected via said multi-directional mechanism to said forward-spanning mechanism and said second connecting piece being connected directly to said backward-spanning mechanism.

7. The pedal-propelled vehicle structure of claim 1, further comprising:

a front adjustment device mounted on said second supporting frame and located ahead of said forward-spanning mechanism for adjusting the span of said forward-spanning mechanism; and a rear adjustment device mounted on said second supporting frame and located ion the back of said backward-spanning mechanism for adjusting the span of said backward-spanning mechanism.

8. The pedal-propelled vehicle structure of claim 7, wherein said front and rear adjustment devices are formed with a first mounting piece and a second mounting piece respectively for securing said front and rear adjustment devices respectively on said first and second connecting pieces on said second supporting frame; said first and second mounting pieces being each mounted with a screwing member for firmly securing said forward-spanning and backward-spanning mechanisms in position.

9. The pedal-propelled vehicle structure of claim 1, wherein said linkage mechanism includes a first linkage assembly and a second linkage assembly on both sides of said first supporting frame and connected between said forward-spanning and backward-spanning mechanisms;

said first and second linkage assembly each including:

a first linkage bar having one end connected to said first supporting beam on said first supporting frame and the other end connected to one pedal;

a second linkage bar having one end connected to said first linkage bar;

a third linkage bar having one end connected to said front bar on said forward-spanning mechanism;

a fourth linkage bar having one end connected to said rear bar on said backward-spanning mechanism; and a substantially T-shaped linkage piece having a first connecting piece and a second connecting piece which are perpendicularly jointed at a jointing point which is pivotally connected to said second supporting beam on said first supporting frame; wherein said first connecting piece has a first end pivotally connected to one end of said second linkage bar and a second end connected to said second connecting piece; and said second connecting piece has a first end pivotally connected to said third linkage bar and a second end pivotally connected to said fourth linkage bar; and by means of said linkage mechanism, wherein a foot power is applied to said pedal, the foot power will be transmitted thorough said linkage mechanism to extend said forward-spanning mechanism and backward-spanning mechanism outwards.

10. The pedal-propelled vehicle structure of claim 1, wherein each of said front braking assembly and said rear braking assembly includes:

a braking piece having a curved back;

a pivoting bar pivotally connected to said corresponding bar and having one end connected to said corresponding transmission device and the other end connected to said third transmission device;

a braking bar mounted at the pivoting point of said pivoting bar and having an elastic member therein; and a ball bearing mounted at the tip of said braking bar for allowing said braking bar to slide freely over the curved back of said braking piece;

wherein said braking bar pushes against said braking piece so as to drive said braking piece to apply a braking force.

11. The pedal-propelled vehicle structure of claim 10, wherein each of said front braking piece and said rear braking piece includes a pair of spaced pointed pieces for braking said front and rear gears respectively.

12. The pedal-propelled vehicle structure of claim 1, wherein said brake control mechanism includes:

a brake lever pivotally connected to a turnable handlebar on said steering mechanism;

an elastic member having two elongated ends elastically abutting respectively on said brake lever and said turnable handlebar, which allows said brake lever to be restored to original position after being pressed and released;

a mounting device fixed on said handlebar on said steering mechanism, said mounting device being formed with a plurality of positioning holes for positioning of said brake lever; and a control device mounted on said turnable handlebar for controlling said brake mechanism.

13. The pedal-propelled vehicle structure of claim 1, further including a seating body for the rider to sit thereon.

14. The pedal-propelled vehicle structure of claim 13, wherein said seating body is shaped in the form of an animal.

15. A pedal-propelled vehicle structure, comprising:

a first supporting frame, having a hollowed main column in which an elastic member is mounted;

a second supporting frame including an upright slidable bar having one end inserted into the hollowed inside of said hollowed main column on said first supporting frame to abut on the upper end of said elastic member;

a forward-spanning mechanism connected by means of a multi-directional mechanism to said second supporting frame, said forward-spanning mechanism including a front bar and a front wheel connected to said front bar;

a backward-spanning mechanism mounted on said second supporting frame, said backward-spanning mechanism including a rear bar and a rear wheel connected to said rear bar;

a front adjustment device and a read adjustment device mounted on said second supporting frame, said front adjustment device being contacted to said forward-spanning mechanism for adjusting the span of said forward-spanning mechanism, and said rear adjustment device being contacted to said backward-spanning mechanism for adjusting the span of said backward-spanning mechanism;

pedal means for a rider of said pedal-propelled vehicle to supply foot power to said pedal-propelled vehicle;

a linkage mechanism, coupled to said pedal means, for transmitting the foot power from the rider to said forward-spanning mechanism and said backward-spanning mechanism;

a steering mechanism, mounted on said second supporting frame, for the rider to control the moving direction of said pedal-propelled vehicle;

a brake mechanism, coupled to said front and rear wheels so as to brake said front and rear wheels; and a brake control mechanism, mounted on said steering mechanism, for controlling said brake mechanism.

16. The pedal-propelled vehicle structure of claim 15, wherein said first supporting frame includes:

a first auxiliary beam horizontally oriented mounted on the bottom of said hollowed main column; a pair of auxiliary supporting wheels mounted on both ends of said first auxiliary beam; and a first supporting beam and a second supporting beam connected horizontally to one side of said hollowed main column for supporting said linkage mechanism; said first supporting beam, said first auxiliary beam, and said hollowed main column forming a three dimensional structure.

17. The pedal-propelled vehicle structure of claim 15, wherein said forward-spanning and backward-spanning mechanisms are linked by means of an elastic mechanism connected to said hollowed main column on said first supporting frame, said elastic mechanism being used to pull said forward-spanning and backward-spanning mechanisms inwards.

18. The pedal-propelled vehicle structure of claim 17, wherein said elastic mechanism includes:

a first spring connected between said front bar on said forward-spanning mechanism and said hollowed main column on said first supporting frame; and a second spring connected between said rear bar on said backward-spanning mechanism and said hollowed main column on said first supporting frame.

19. The pedal-propelled vehicle structure of claim 15, wherein said upright slidable bar has a flange abutting on said elastic member and said hollowed main column has a narrowed opening for preventing said upright slidable bar from being pulled away from said hollowed main column.

20. The pedal-propelled vehicle structure of claim 15, wherein said second supporting frame further includes a main beam supported on said upright slidable bar and a first connecting piece and a second connecting piece mounted on both ends of said main beam, said first connecting piece being connected via said multi-directional mechanism to said forward-spanning mechanism and said second connecting piece being connected directly to said backward-spanning mechanism.

21. The pedal-propelled vehicle structure of claim 15, each of said front and rear adjustment devices is formed with a mounting piece for securing said front and rear adjustment devices respectively on said first and second connecting pieces on said second supporting frame; said mounting pieces being each provided with a screwing member for securing said forward-spanning and backward-spanning mechanism firmly in position.

22. The pedal-propelled vehicle structure of claim 15, wherein said linkage mechanism includes a firs linkage assembly and a second linkage assembly on both sides of said first supporting frame and connected between said forward-spanning and backward-spanning mechanisms;

said first and second linkage assembly each including:
  a first linkage bar having one end connected to said first supporting beam on said first supporting frame and the other end connected to one pedal;
  a second linkage bar having one end connected to said first linkage bar;
  a third linkage bar having one end connected to said front bar on said forward-spanning mechanism;
  a fourth linkage bar having one end connected to said rear bar on said backward-spanning mechanism; and
  a substantially T-shaped linkage piece having a first connecting piece and a second connecting piece which are perpendicularly jointed at a jointing point which is pivotally connected to said second supporting beam on said first supporting frame; wherein said first connecting piece has a first end pivotally connected to one end of said second linkage bar and a second end connected to said second connecting piece; and said second connecting piece has a first end pivotally connected to said third linkage bar and a second end pivotally connected to said fourth linkage bar; and by means of said linkage mechanism, whenever a foot power is applied to said pedal, the foot power will be transmitted through said linkage mechanism to extend said forward-spanning mechanism and backward-spanning mechanism outwards.

23. The pedal-propelled vehicle structure of claim 15, said brake mechanism including:
  a front brake mechanism coupled to said forward-spanning mechanism, including a front gear coupled to said front wheel, a front braking piece for applying brake to said front gear, and a front braking assembly for braking said front braking piece, said front braking assembly controlling said front braking piece so as to brake said front gear;
  a rear brake mechanism coupled to said backward-spanning mechanism, including a rear gear coupled to said rear wheel, a rear braking piece for applying brake to said rear gear, and a rear braking assembly for braking said rear braking piece, said rear braking assembly controlling said rear braking piece so as to brake said rear gear; and
  a transmission mechanism including a first transmission device connected to said brake control mechanism and said front braking assembly, a second transmission device connected to said brake control mechanism and said rear braking assembly, and a third transmission device connected to said front braking assembly and rear braking assembly;
  wherein said transmission mechanism is under control of said brake control mechanism to control said front brake mechanism and said rear brake mechanism to brake said front and rear wheels.

24. The pedal-propelled vehicle structure of claim 23, wherein each of said front braking assembly and said rear braking assembly includes:

a braking piece having a curved back;
  a pivoting bar pivotally connected to said corresponding bar and having one end connected to said corresponding transmission device and the other end connected to said third transmission device;
  a braking bar mounted at the pivoting point of said pivoting bar and having an elastic member therein; and
  a ball bearing mounted at the tip of said braking bar for allowing said braking bar to slide freely over the curved back of said braking piece;
  wherein said braking bar pushes against said braking piece so as to drive said braking piece to apply a braking force.

25. The pedal-propelled vehicle structure of claim 23, wherein each of said front braking piece and said rear braking piece includes a pair of spaced pointed pieces for braking said front and rear gears respectively.

26. The pedal-propelled vehicle structure of claim 15, wherein said brake control mechanism includes:
  a brake lever pivotally connected to a turnable handlebar on said steering mechanism;
  an elastic member having two elongated ends elastically abutting respectively on said brake lever and said turnable handlebar, which allows said brake lever to be restored to original position after being pressed and released;
  a mounting device fixed on said handlebar on said steering mechanism, said mounting device being formed with a plurality of positioning holes for positioning of said brake lever; and
  a control device mounted on said turnable handlebar for controlling said brake mechanism.

27. The pedal-propelled vehicle structure of claim 15, further including a seating body for the rider to sit thereon.

28. The pedal-propelled vehicle structure of claim 27, wherein said seating body is shaped in the form of an animal.

29. A pedal-propelled vehicle structure, comprising:
  a first supporting frame;
  a second supporting frame linked to and slidable on said first supporting frame;
  a forward-spanning mechanism connected by means of a multi-directional mechanism to said second supporting frame, said forward-spanning mechanism including a front bar and a front wheel connected to said front bar;
  a backward-spanning mechanism mounted on said second supporting frame, said backward-spanning mechanism including a rear bar and a rear wheel connected to said rear bar;
  pedal means for a rider of said pedal-propelled vehicle to supply foot power to said pedal-propelled vehicle;
  a linkage mechanism, coupled to said pedal means, for transmitting the foot power from the rider to said forward-spanning mechanism and said backward-spanning mechanism;
  a steering mechanism, mounted on said second supporting frame, for the rider to control the moving direction of said pedal-propelled vehicle;
  a brake mechanism, coupled to said front and rear wheels so as to brake said front and rear wheels, said brake mechanism including:
    a front brake mechanism coupled to said forward-spanning mechanism, including a front gear coupled to said front wheel, a front braking piece for applying brake to said front gear, and a front braking assembly for braking said front braking piece, said front braking assembly controlling said front braking piece so ss to brake said front gear;

a rear brake mechanism coupled to said backward-spanning mechanism, including a rear gear coupled to said rear wheel, a rear braking piece for applying brake to said rear gear, and a rear braking assembly for braking said rear braking piece, said rear braking assembly controlling said rear braking piece so as to brake said rear gear; and a transmission mechanism including a first transmission device connected to a brake control mechanism and said front braking assembly, said brake control mechanism being mounted on said steering mechanism for controlling said brake mechanism; a second transmission device connected to said brake control mechanism and said rear braking assembly; and a third transmission device connected to said front braking assembly and rear braking assembly, said transmission mechanism being under control of said brake control mechanism to control said front brake mechanism and said rear brake mechanism to brake said front and rear wheels.

30. The pedal-propelled vehicle structure of claim 29, wherein said first supporting frame includes:

a hollowed main column in which an elastic member is mounted;

a first auxiliary beam linked in perpendicular to said hollowed main column;

a pair of auxiliary supporting wheels mounted on both ends of said first auxiliary beam;

a first supporting beam linked in perpendicular to said hollowed main column and said first auxiliary beam to form a three-dimensional structure; and a second supporting beam linked to said hollowed main column;

wherein said first and second supporting beams are used in combination to support said linkage mechanism.

31. The pedal-propelled vehicle structure of claim 29, wherein said second supporting frame further includes:

an upright slidable bar slidably inserted in the hollowed inside of said hollowed main column;

a horizontal main beam linked in perpendicular to said upright slidable bar;

a first connecting piece and a second connecting piece linked respectively on the opposite ends of said horizontal main beam;

wherein said first connecting piece is linked via said multi-directional mechanism to said forward-spanning mechanism and said second connecting piece is linked directly to said backward-spanning mechanism.

32. The pedal-propelled vehicle structure of claim 31, wherein said upright slidable bar has a flange abutting on said elastic member and said hollowed main column has a narrowed opening for preventing said upright slidable bar from being pulled away from said hollowed main column.

33. The pedal-propelled vehicle structure of claim 29, further including:

an elastic mechanism connecting said forward-spanning mechanism and said backward-spanning mechanism to said hollowed main column on said first supporting frame for pulling said forward-spanning mechanism and said backward-spanning mechanism inwards.

34. The pedal-propelled vehicle structure of claim 33, wherein said elastic mechanism includes:

a first spring connected between said front bar on said forward-spanning mechanism and said hollowed main column on said first supporting frame; and a second spring connected between said rear bar on said backward-spanning mechanism and said hollowed main column on said first supporting frame.

35. The pedal-propelled vehicle structure of claim 29, further comprising:

a front adjustment device mounted on said second supporting frame and located ahead of said forward-spanning mechanism for adjusting the span of said forward-spanning mechanism; and a rear adjustment device mounted on said second supporting frame and located on the back of said backward-spanning mechanism for adjusting the span of said backward-spanning mechanism.

36. The pedal-propelled vehicle structure of claim 35, each of said front and rear adjustment devices is formed with a mounting piece for securing said front and rear adjustment devices respectively on said first and second connecting pieces on said second supporting frame; said mounting pieces being each provided with a screwing member for securing said forward-spanning and backward-spanning mechanisms firmly in position.

37. The pedal-propelled vehicle structure of claim 29, wherein said linkage mechanism includes a first linkage assembly and a second linkage assembly on both sides of said first supporting frame and connected between said forward-spanning and backward-spanning mechanisms;

said first and second linkage assembly each including:

a first linkage bar having one end connected to said first supporting beam on said first supporting frame and the other end connected to one pedal;

a second linkage bar having one end connected to said first linkage bar;

a third linkage bar having one end connected to said front bar on said forward-spanning mechanism;

a fourth linkage bar having one end connected to said rear bar on said backward-spanning mechanism; and a substantially T-shaped linkage piece having a first connecting piece and a second connecting piece which are perpendicularly jointed at a jointing point which is pivotally connected to said second supporting beam on said first supporting frame; wherein said first connecting piece has a first end pivotally connected to one end of said second linkage bar and a second end connected to said second connecting piece; and said second connecting piece has a first end pivotally connected to said third linkage bar and a second end pivotally connected to said fourth linkage bar; and by means of said linkage mechanism, whenever a foot power is applied to said pedal, the foot power will be transmitted through said linkage mechanism to extend said forward-spanning mechanism and backward-spanning mechanism outwards.

38. The pedal-propelled vehicle structure of claim 29, wherein each of said front braking assembly and said rear braking assembly includes:

a braking piece having a curved back;

a pivoting bar pivotally connected to said corresponding bar and having one end connected to said corresponding transmission device and the other end connected to said third transmission device;

a braking bar mounted at the pivoting point of said pivoting bar and having an elastic member therein; and a ball bearing mounted at the tip of said braking bar for allowing said braking bar to slide freely over the curved back of said braking piece;

wherein said braking bar pushes against said braking piece so as to drive said braking piece to apply a braking force.

39. The pedal-propelled vehicle structure of claim 38, wherein each of said front braking piece and said rear braking piece includes a pair of spaced pointed pieces for braking said front and rear gears respectively.

40. The pedal-propelled vehicle structure of claim 29, wherein said brake control mechanism includes:

a brake lever pivotally connected to a turnable handlebar on said steering mechanism;

an elastic member having two elongated ends elastically abutting respectively on said brake lever and said turnable handlebar, which allows said brake lever to be restored to original position after being pressed and released;

a mounting device fixed on said handlebar on said steering mechanism, said mounting device being formed with a plurality of positioning holes for positioning of said brake lever; and a control device mounted on said turnable handlebar for controlling said brake mechanism.

41. The pedal-propelled vehicle structure of claim 29, further including a seating body for the rider to sit thereon.

42. The pedal-propelled vehicle structure of claim 41, wherein said seating body is shaped in the form of an animal.

* * * * *